US011314316B2

(12) United States Patent
Uchida et al.

(10) Patent No.: US 11,314,316 B2
(45) Date of Patent: Apr. 26, 2022

(54) MODEM TO SELECTIVELY SUPERPOSE ELECTRIC POWER

(71) Applicant: Mitsubishi Electric Corporation, Tokyo (JP)

(72) Inventors: Yoshiyuki Uchida, Tokyo (JP); Kazuhiko Tanaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/966,478

(22) PCT Filed: May 21, 2018

(86) PCT No.: PCT/JP2018/019525
§ 371 (c)(1),
(2) Date: Jul. 31, 2020

(87) PCT Pub. No.: WO2019/224883
PCT Pub. Date: Nov. 28, 2019

(65) Prior Publication Data
US 2021/0041936 A1   Feb. 11, 2021

(51) Int. Cl.
*G06F 1/26* (2006.01)
*G06F 1/3234* (2019.01)
(Continued)

(52) U.S. Cl.
CPC ............ *G06F 1/3278* (2013.01); *G06F 1/263* (2013.01); *G06F 1/266* (2013.01); *H04L 12/2801* (2013.01); *H04L 49/20* (2013.01)

(58) Field of Classification Search
CPC ........ G06F 1/3278; G06F 1/263; G06F 1/266; H04L 12/2801; H04L 49/20; H04M 11/00; H04Q 9/00; Y02D 10/00
(Continued)

(56) References Cited

U.S. PATENT DOCUMENTS

| 2005/0141683 | A1* | 6/2005 | Ishii | ...................... H04L 5/0094 |
|---|---|---|---|---|
| | | | | 379/93.01 |
| 2007/0149258 | A1* | 6/2007 | Tokunaga | ................ H04B 3/54 |
| | | | | 455/574 |
| 2016/0173290 | A1 | 6/2016 | Yamada | |

FOREIGN PATENT DOCUMENTS

JP   2010-258769 A   11/2010
JP   2012-175644 A   9/2012
(Continued)

OTHER PUBLICATIONS

Chinese Office Action dated Mar. 30, 2021 in Chinese Application No. 201880093082.5.
(Continued)

*Primary Examiner* — Chun Cao
(74) *Attorney, Agent, or Firm* — Xsensus LLP

(57) ABSTRACT

An object of the present invention is to provide a modem (5, 6) that is capable of suppressing electric power consumption by switching an operation according to a power supply circumstance in an installation environment. The modem (5, 6) includes a low-voltage power supply terminal (502, 602) and a high-voltage power supply terminal (503, 603). The low-voltage power supply terminal (502, 602) is not connected to a power supply unit (506, 606). When electric power is supplied from the high-voltage power supply terminal (503, 603), a first superposition unit (508, 608) superposes the electric power input from the high-voltage power supply terminal (503, 603) on a signal to be transferred to a communication path.

12 Claims, 3 Drawing Sheets

(51) Int. Cl.
*H04L 12/28* (2006.01)
*H04L 49/20* (2022.01)

(58) Field of Classification Search
USPC .......................................... 713/320
See application file for complete search history.

(56) References Cited

FOREIGN PATENT DOCUMENTS

| | | | |
|---|---|---|---|
| JP | 2014-072722 | * | 4/2014 |
| KR | 10-2016-0010922 | | 1/2016 |
| WO | 2014/188633 A1 | | 11/2014 |

OTHER PUBLICATIONS

International Search Report and Written Opinion dated Jun. 19, 2018 for PCT/JP2018/019525 filed on May 21, 2018, 9 pages including English Translation of the International Search Report.
Office Action dated Jun. 30, 2021 in German application No. 112018007642.3.
Office Action dated Jan. 21, 2022 in Chinese Patent Application No. 201880093082.5, 14 pages.

* cited by examiner

Fig. 2

| | |
|---|---|
| 2: CAMERA | 505: SIGNAL PROCESSING UNIT |
| 3: MONITORING TERMINAL UNIT | 506: POWER SUPPLY UNIT |
| 8: EXTERNAL POWER SUPPLY | 507: SWITCHING UNIT |
| 10: EXTERNAL POWER SUPPLY | 508: FIRST SUPERPOSITION UNIT |
| 13: EXTERNAL POWER SUPPLY | |
| 15: EXTERNAL POWER SUPPLY | |

| | |
|---|---|
| 605: SIGNAL PROCESSING UNIT | |
| 606: POWER SUPPLY UNIT | |
| 607: SWITCHING UNIT | |
| 608: FIRST SUPERPOSITION UNIT | |
| 609: SECOND SUPERPOSITION UNIT | |

MODEM TO SELECTIVELY SUPERPOSE ELECTRIC POWER

CROSS-REFERENCE TO RELATED APPLICATION

The present application is based on PCT filing PCT/JP2018/019525, filed May 21, 2018, the entire contents of which are incorporated herein by reference.

FIELD

The present invention relates to a modem.

BACKGROUND

PTL 1 discloses an example of a communication system. The communication system includes a plurality of modems, a power supplying device, and a terminal device. The power supplying device supplies, through a communication path, electric power to the modem to which an external power supply is unavailable.

CITATION LIST

Patent Literature

[PTL 1] JP 2010-258769 A

SUMMARY

Technical Problem

However, in the communication system disclosed in PTL 1, when a power supply is available to each of a plurality of modems, there occurs a loss due to generating the electric power as the power supply of the modem.

The present invention has been made to solve the above-described problem. An object of the present invention is to provide a modem that is capable of suppressing electric power consumption.

Solution to Problem

A modem comprising according to the present invention is provided with: a signal processing unit that processes and transfers a signal between a terminal device and a communication path; a power supply unit that generates electric power as a power supply of the signal processing unit from input electric power; a low-voltage power supply terminal that is not connected to the power supply unit; a high-voltage power supply terminal that is connected to the power supply unit; and a first superposition unit that, when electric power is input from the low-voltage power supply terminal connected to an external power supply to the signal processing unit, does not superpose the electric power on the signal to be transferred to the communication path by the signal processing unit, and, when the electric power is input from the high-voltage power supply terminal connected to an external power supply to the signal processing unit through the power supply unit, superposes the electric power input from the high-voltage power supply terminal on the signal to be transferred to the communication path by the signal processing unit.

Advantageous Effects of Invention

According to the present invention, a modem includes a low-voltage power supply terminal and a high-voltage power supply terminal. The low-voltage power supply terminal is not connected to a power supply unit. When the electric power is supplied from the low-voltage power supply terminal, there occurs no conversion loss of the electric power due to generating the electric power by the power supply unit. When the electric power is supplied from the high-voltage power supply terminal, a first superposition unit superposes the electric power input from the high-voltage power supply terminal on a signal to be transferred to a communication path. This can suppress an electric power loss in the communication path. In this way, the modem can suppress electric power consumption by switching an operation according to a power supply circumstance in an installation environment.

BRIEF DESCRIPTION OF DRAWINGS

FIG. 2 is a circuit diagram illustrating a configuration of a communication system provided with modems according to Embodiment 2.

DESCRIPTION OF EMBODIMENTS

Embodiments of the present invention will now be described with reference to the attached drawings. Components that are the same or equivalent are assigned the same reference signs throughout the drawings. Duplicate descriptions are appropriately abbreviated or omitted.

Embodiment 1

Figure 1:
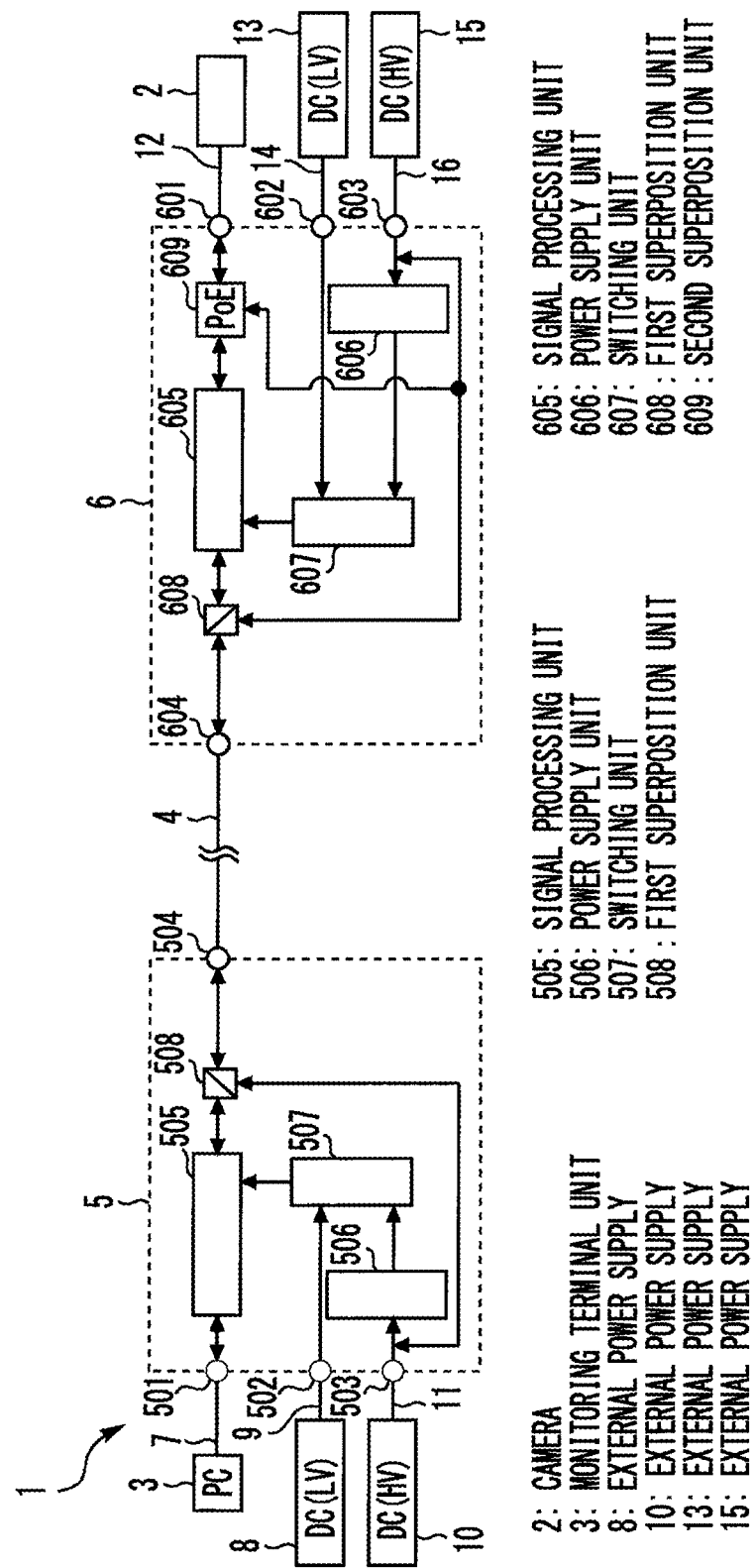
FIG. 1 is a circuit diagram illustrating a configuration of a communication system provided with modems according to Embodiment 1.

FIG. 1 is a circuit diagram illustrating a configuration of a communication system provided with modems according to Embodiment 1.

A communication system 1 is applied to, for example, an elevator monitoring system. The elevator monitoring system includes a camera 2, and a monitoring terminal unit 3.

The camera 2 is configured to be capable of taking images of a monitoring location. The camera 2 is, for example, a network camera. The camera 2 is an example of a terminal device. The monitoring location is, for example, inside of a car of an elevator.

The monitoring terminal unit 3 is configured to be capable of displaying an image taken by the camera 2. The monitoring terminal unit 3 is, for example, a personal computer. The monitoring terminal unit 3 is an example of a terminal device.

The communication system 1 includes a cable 4, a primary modem 5, and a secondary modem 6.

The cable 4 forms a communication path through which a signal is communicated between the primary modem 5 and the secondary modem 6. The cable 4 connects between the primary modem 5 and the secondary modem 6. The cable 4 is, for example, a coaxial cable.

The primary modem 5 includes a connection terminal 501, a low-voltage power supply terminal 502, a high-voltage power supply terminal 503, a communication terminal 504, a signal processing unit 505, a power supply unit 506, a switching unit 507, and a first superposition unit 508.

The connection terminal 501 is a terminal for transferring a signal between the connection terminal 501 and the monitoring terminal unit 3 through a cable 7. The cable 7 is, for example, a twisted pair cable. The low-voltage power supply terminal 502 is a terminal for receiving electric power from an external power supply 8 through a power supply cord 9. The external power supply 8 is an independent low-voltage direct current power supply. The high-voltage power supply terminal 503 is a terminal for receiving electric power from an external power supply 10 through a power supply cord 11. The external power supply 10 is an independent high-voltage direct current power supply. The high voltage is, for example, 48 V. The high voltage is higher than the low voltage. The low voltage is, for example, 12 V. The communication terminal 504 is a terminal for transferring a signal to the communication path. The communication terminal 504 is connected to the cable 4.

The signal processing unit 505 is configured to be capable of processing to modulate and demodulate a signal. The modulation and demodulation include, for example, digital modulation of converting a digital signal into an analog signal, and digital demodulation of converting the analog signal into the digital signal. The digital signal is, for example, an Ethernet (registered trademark) signal. The signal processing unit 505 is operated by, for example, a low-voltage power supply.

The power supply unit 506 is connected to the high-voltage power supply terminal 503. The power supply unit 506 is configured to be capable of generating electric power as a power supply of the signal processing unit 505 from the electric power input from the high-voltage power supply terminal 503.

The switching unit 507 receives the input of the power supply from either the low-voltage power supply terminal 502 or the power supply unit 506. The switching unit 507 is configured to be capable of switching the power supply to be input depending on whether the high-voltage power supply terminal 503 is connected to the external power supply 10 or the low-voltage power supply terminal 502 is connected to the external power supply 8. The switching unit 507 is connected to the signal processing unit 505 to be capable of outputting the input electric power to the signal processing unit 505.

The first superposition unit 508 includes a filter and a mixer. The filter is configured to allow a signal to pass in both directions, the signal having a frequency higher than a predetermined frequency. The mixer is configured to be capable of superposing the electric power on the signal to be transferred to the communication path by the signal processing unit 505. The first superposition unit 508 is connected to the high-voltage power supply terminal 503 to be capable of receiving the electric power to be superposed by the mixer.

The secondary modem 6 includes a connection terminal 601, a low-voltage power supply terminal 602, a high-voltage power supply terminal 603, a communication terminal 604, a signal processing unit 605, a power supply unit 606, a switching unit 607, a first superposition unit 608, and a second superposition unit 609.

The connection terminal 601 is a terminal for transferring a signal between the connection terminal 601 and the camera 2 through a cable 12. The cable 12 is, for example, a twisted pair cable. The low-voltage power supply terminal 602 is a terminal for receiving electric power from an external power supply 13 through a power supply cord 14. The external power supply 13 is an independent low-voltage direct current power supply. The low voltage is, for example, 12 V. The high-voltage power supply terminal 603 is a terminal for receiving electric power from an external power supply 15 through a power supply cord 16. The external power supply 15 is an independent high-voltage direct current power supply. The high voltage is, for example, 48 V. The communication terminal 604 is a terminal for transferring a signal to the communication path. The communication terminal 604 is connected to the cable 4.

The signal processing unit 605 is configured to be capable of processing to modulate and demodulate a signal. The modulation and demodulation include, for example, digital modulation of converting a digital signal into an analog signal, and digital demodulation of converting the analog signal into the digital signal. The digital signal is, for example, an Ethernet signal. The signal processing unit 605 is operated by, for example, a low-voltage power supply.

The power supply unit 606 is connected to the high-voltage power supply terminal 603. The power supply unit 606 is configured to be capable of generating electric power as a power supply of the signal processing unit 605 from the electric power input from the high-voltage power supply terminal 603.

The switching unit 607 receives the input of the power supply from either the low-voltage power supply terminal 602 or the power supply unit 606. The switching unit 607 is configured to be capable of switching the power supply to be input depending on whether the high-voltage power supply terminal 603 is connected to the external power supply 15 or the low-voltage power supply terminal 602 is connected to the external power supply 13. The switching unit 607 is connected to the signal processing unit 605 to be capable of outputting the input electric power to the signal processing unit 605.

The first superposition unit 608 includes a filter and a mixer. The filter is configured to allow a signal to pass in both directions, the signal having a frequency higher than a predetermined frequency. The mixer is configured to be capable of superposing the electric power on the signal to be transferred to the communication path by the signal processing unit 605. The first superposition unit 608 is connected to the high-voltage power supply terminal 603 to be capable of receiving the electric power to be superposed by the mixer.

The second superposition unit 609 includes a filter and a power over Ethernet (registered trademark) (PoE) processor. The filter is configured to allow a signal to pass in both directions, the signal having a frequency higher than a predetermined frequency. The PoE processor is configured to be capable of superposing the electric power on the Ethernet signal through which the signal processing unit 605 communicates with the camera 2 serving as the terminal device. The second superposition unit 609 is connected to the high-voltage power supply terminal 603 to be capable of receiving the electric power to be superposed by the PoE processor.

Subsequently, an operation of the communication system 1 will now be described.

The operation of the communication system 1 performed when low-voltage external power supplies are available to the primary modem 5 and the secondary modem 6, respectively, and an external power supply is available to the camera 2 will now be described. In this case, the low-voltage power supply terminal 502 of the primary modem 5 is connected to the external power supply 8 through the power supply cord 9. The low-voltage power supply terminal 602 of the secondary modem 6 is connected to the external power supply 13 through the power supply cord 14. The camera 2 is connected to, for example, an outlet of a commercial alternate current power supply (not illustrated)

serving as the external power supply, through an alternative current/direct current (AC/DC) conversion adaptor.

The camera 2 is operated by the electric power supplied from the external power supply. The camera 2 transfers a taken image of the monitoring location with the use of the Ethernet signal to the connection terminal 601 of the secondary modem 6 through the cable 12.

The secondary modem 6 is operated by the low-voltage electric power supplied from the external power supply 13. At this time, the power supply unit 606 does not generate the electric power. The switching unit 607 outputs, to the signal processing unit 605, the electric power received from the external power supply 13. The signal processing unit 605 modulates the signal transferred from the connection terminal 601. The signal processing unit 605 transfers the modulated signal to the communication path through the communication terminal 604. At this time, the first superposition unit 608 does not superpose the electric power on the digital modulated signal.

The cable 4 forming the communication path transfers, to the communication terminal 504 of the primary modem 5, the signal transferred from the communication terminal 604 of the secondary modem 6.

The primary modem 5 is operated by the low-voltage electric power supplied from the external power supply 8. At this time, the power supply unit 506 does not generate the electric power. The switching unit 507 outputs, to the signal processing unit 505, the electric power received from the external power supply 8. The signal processing unit 505 demodulates the signal transferred from the communication terminal 504. The signal processing unit 505 transfers the demodulated signal to the monitoring terminal unit 3 through the connection terminal 501.

The monitoring terminal unit 3 is operated by the electric power supplied from an external power supply (not illustrated). The monitoring terminal unit 3 displays the image taken by the camera 2 based on the signal transferred from the connection terminal 501.

A monitoring staff inputs an operation of the camera 2 to the monitoring terminal unit 3. The monitoring terminal unit 3 transfers the input operation with the use of the Ethernet signal to the connection terminal 501 of the primary modem 5 through the cable 7.

The signal processing unit 505 of the primary modem 5 modulates the signal transferred from the connection terminal 501. The signal processing unit 505 transfers the modulated signal to the communication path through the communication terminal 504. At this time, the first superposition unit 508 does not superpose the electric power on the modulated signal.

The cable 4 transfers, to the communication terminal 604 of the secondary modem 6, the signal transferred from the communication terminal 504 of the primary modem 5.

The signal processing unit 605 of the secondary modem 6 demodulates the signal transferred from the communication terminal 604. The signal processing unit 605 transfers the demodulated signal to the camera 2 through the connection terminal 601. At this time, the second superposition unit 609 does not superpose the electric power on the demodulated signal.

The camera 2 is operated based on the operation indicated by the signal transferred from the connection terminal 601.

Next, the operation of the communication system 1 performed when a high-voltage external power supply is available to the primary modem 5, and an external power supply is unavailable to each of the secondary modem 6 and the camera 2 will now be described. In this case, the high-voltage power supply terminal 503 of the primary modem 5 is connected to the external power supply 10 through the power supply cord 11.

The primary modem 5 is operated by the high-voltage electric power supplied from the external power supply 10. The power supply unit 506 generates low-voltage electric power from the electric power input from the high-voltage power supply terminal 503. The switching unit 507 outputs, to the signal processing unit 505, the electric power received from the external power supply 10 through the power supply unit 506. The signal processing unit 505 modulates the signal transferred from the connection terminal 501. The signal processing unit 505 transfers the modulated signal to the communication path through the communication terminal 504. The mixer of the first superposition unit 508 superposes, on the modulated signal, the direct current high-voltage electric power supplied from the high-voltage power supply terminal 503.

The cable 4 transfers, to the communication terminal 604 of the secondary modem 6, the signal transferred from the communication terminal 504 of the primary modem 5 with the electric power superposed thereon.

The secondary modem 6 is operated by the high-voltage electric power superposed on the signal transferred from the communication terminal 604. The filter of the first superposition unit 608 separates the direct current high-voltage electric power from the signal transferred from the communication terminal 604. The power supply unit 606 generates low-voltage electric power from the direct current high-voltage electric power separated by the filter of the first superposition unit 608. The switching unit 607 outputs, to the signal processing unit 605, the electric power received from the filter of the first superposition unit 608 through the power supply unit 606. The signal processing unit 605 demodulates the signal transferred from the communication terminal 604. The signal processing unit 605 transfers the demodulated signal to the camera 2 through the connection terminal 601. The PoE processor of the second superposition unit 609 superposes, on the demodulated signal, the direct current high-voltage electric power separated by the filter of the first superposition unit 608.

The camera 2 is operated by the electric power superposed on the signal transferred from the connection terminal 601. The camera 2 is operated based on the operation indicated by the signal transferred from the connection terminal 601.

Next, the operation of the communication system 1 performed when a high-voltage external power supply is available to the secondary modem 6, and an external power supply is unavailable to each of the primary modem 5 and the camera 2 will now be described. In this case, the high-voltage power supply terminal 603 of the secondary modem 6 is connected to the external power supply 15 through the power supply cord 16.

The secondary modem 6 is operated by the high-voltage electric power supplied from the external power supply 15. The power supply unit 606 generates low-voltage electric power from the electric power input from the high-voltage power supply terminal 603. The switching unit 607 outputs, to the signal processing unit 605, the electric power received from the external power supply 15 through the power supply unit 606. The signal processing unit 605 demodulates the signal received from the communication terminal 604. The signal processing unit 605 transfers the demodulated signal to the camera 2 through the connection terminal 601. The PoE processor of the second superposition unit 609 superposes, on the demodulated signal, the direct current high-voltage electric power supplied from the high-voltage power supply terminal 603.

The camera 2 is operated by the electric power superposed on the signal transferred from the connection terminal 601. The camera 2 is operated based on the operation indicated by the signal transferred from the connection terminal 601. The camera 2 inputs a taken image of the monitoring location with the use of the Ethernet signal to the connection terminal 601 of the secondary modem 6 through the cable 12.

The signal processing unit 605 of the secondary modem 6 modulates the signal transferred from the connection terminal 601. The signal processing unit 605 transfers the modulated signal to the communication path through the communication terminal 604. The mixer of the first superposition unit 608 superposes, on the modulated signal, the direct current high-voltage electric power supplied from the high-voltage power supply terminal 603.

The cable 4 transfers, to the communication terminal 504 of the primary modem 5, the signal transferred from the communication terminal 604 of the secondary modem 6 with the electric power superposed thereon.

The primary modem 5 is operated by the high-voltage electric power superposed on the signal transferred from the communication terminal 504. The filter of the first superposition unit 508 separates the direct current high-voltage electric power from the signal transferred from the communication terminal 504. The power supply unit 506 generates low-voltage electric power from the direct current high-voltage electric power separated by the filter of the first superposition unit 508. The switching unit 507 outputs, to the signal processing unit 505, the electric power received from the filter of the first superposition unit 508 through the power supply unit 506. The signal processing unit 505 demodulates the signal transferred from the communication terminal 504. The signal processing unit 505 transfers the demodulated signal to the monitoring terminal unit 3 through the connection terminal 501.

The monitoring terminal unit 3 is operated by the electric power supplied from an external power supply (not illustrated). The monitoring terminal unit 3 displays the image taken by the camera 2 based on the signal transferred from the connection terminal 501.

As described above, the primary modem 5 according to Embodiment 1 includes the signal processing unit 505, the power supply unit 506, the low-voltage power supply terminal 502, the high-voltage power supply terminal 503, and the first superposition unit 508. The signal processing unit 505 processes and transfers the signal between the monitoring terminal unit 3 serving as the terminal device and the communication path. The power supply unit 506 generates the electric power as the power supply of the signal processing unit 505 from the input electric power. The low-voltage power supply terminal 502 is not connected to the power supply unit 506. The high-voltage power supply terminal 503 is connected to the power supply unit 506. When the electric power is input from the low-voltage power supply terminal 502 connected to the external power supply 8 to the signal processing unit 505, the first superposition unit 508 does not superpose the electric power on the signal to be transferred to the communication path by the signal processing unit 505. When the electric power is input from the high-voltage power supply terminal 503 connected to the external power supply 10 to the signal processing unit 505 through the power supply unit 506, the first superposition unit 508 superposes the electric power on the signal to be transferred to the communication path by the signal processing unit 505. Here, the first superposition unit 508 superposes the electric power input from the high-voltage power supply terminal 503.

The secondary modem 6 includes the signal processing unit 605, the power supply unit 606, the low-voltage power supply terminal 602, the high-voltage power supply terminal 603, and the first superposition unit 608. The signal processing unit 605 processes and transfers the signal between the camera 2 serving as the terminal device and the communication path. The power supply unit 606 generates the electric power as the power supply of the signal processing unit 605 from the input electric power. The low-voltage power supply terminal 602 is not connected to the power supply unit 606. The high-voltage power supply terminal 603 is connected to the power supply unit 606. When the electric power is input from the low-voltage power supply terminal 602 connected to the external power supply 13 to the signal processing unit 605, the first superposition unit 608 does not superpose the electric power on the signal to be transferred to the communication path by the signal processing unit 605. When the electric power is input from the high-voltage power supply terminal 603 connected to the external power supply 15 to the signal processing unit 605 through the power supply unit 606, the first superposition unit 608 superposes the electric power on the signal to be transferred to the communication path by the signal processing unit 605. Here, the first superposition unit 608 superposes the electric power input from the high-voltage power supply terminal 603.

When low-voltage external power supplies are available to the primary modem 5 and the secondary modem 6, respectively, each of the primary modem 5 and the secondary modem 6 is operated by the low-voltage external power supply. At this time, the power supply unit 506 and the power supply unit 606 do not generate the electric power. Therefore, there occurs no conversion loss of the electric power due to generating the electric power as the power supply of each of the signal processing unit 505 and the signal processing unit 605. In this way, each of the primary modem 5 and the secondary modem 6 can suppress electric power consumption by switching the operation according to the power supply circumstance in the installation environment.

Each of the first superposition unit 508 and the first superposition unit 608 superposes the high-voltage electric power on the signal. In this way, an influence of the voltage drop and an electric power loss in the communication path can be suppressed, as compared with the case where the electric power is supplied at a low voltage.

When the electric power is superposed on the signal transferred from the communication path in the case where neither the low-voltage power supply terminal 502 nor the high-voltage power supply terminal 503 is connected to the respective external power supply, the power supply unit 506 generates the electric power as the power supply of the signal processing unit 505 from the superposed electric power. When the electric power is superposed on the signal transferred from the communication path in the case where neither the low-voltage power supply terminal 602 nor the high-voltage power supply terminal 603 is connected to the respective external power supply, the power supply unit 606 generates the electric power as the power supply of the signal processing unit 605 from the superposed electric power.

When the high-voltage external power supply is available to the primary modem 5 and the external power supply is unavailable to the secondary modem 6, both of the primary modem 5 and the secondary modem 6 are operated by the high-voltage electric power. The primary modem 5 is operated by the high-voltage external power supply. The first superposition unit 508 of the primary modem 5 superposes the high-voltage electric power on the signal and transfers it to the communication path. The secondary modem 6 is operated by the high-voltage electric power superposed on the signal transferred from the communication path.

When the high-voltage external power supply is available to the secondary modem 6 and the external power supply is unavailable to the primary modem 5, both of the primary modem 5 and the secondary modem 6 are operated by the high-voltage electric power. The secondary modem 6 is operated by the high-voltage external power supply. The first superposition unit 608 of the secondary modem 6 superposes the high-voltage electric power on the signal and transfers it to the communication path. The primary modem 5 is operated by the high-voltage electric power superposed on the signal transferred from the communication path.

When the external power supply is unavailable to any one of the primary modem 5 and the secondary modem 6, the high-voltage electric power can be supplied from the other through the cable 4. That is, the external power supply does not need to be prepared for both of the primary modem 5 and the secondary modem 6. In the case where the primary modem 5 and the secondary modem 6 are applied to, for example, an elevator monitoring system, it is difficult in some cases to connect the external power supplies to the primary modem 5 and the secondary modem 6, respectively. In such a case, since one of the primary modem 5 and the secondary modem 6 can be supplied with the high-voltage electric power through the cable 4 from the other to which the external power supply is connected, the external power supply does not need to be connected to the one modem. This can increase the degree of freedom in the installation positions of the primary modem 5 and the secondary modem 6 in the elevator monitoring system.

The camera 2 is a network camera, and communicates an image signal with the use of a digital signal. The signal from the network camera is communicated through, for example, a twisted pair cable. On the other hand, the twisted pair cable is limited in a length allowing communication. Here, in the communication system 1, the modems modulate and demodulate a signal from the camera 2, thereby communicating the signal through the cable 4. In this way, the communication system 1 allows a long-distance communication through, for example, the cable 4 such as a coaxial cable, without degrading the image signal.

In addition, the secondary modem 6 includes the second superposition unit 609. When the electric power is input from the low-voltage power supply terminal 602 connected to the external power supply 13 to the signal processing unit 605, the second superposition unit 609 does not superpose the electric power on the signal to be transferred to the camera 2 by the signal processing unit 605. When the electric power is input from the high-voltage power supply terminal 603 connected to the external power supply 13 to the signal processing unit 605 through the power supply unit 606, the second superposition unit 609 superposes the electric power on the signal to be transferred to the camera 2 by the signal processing unit 605. Here, the second superposition unit 609 superposes the electric power input from the high-voltage power supply terminal 603.

Accordingly, the external power supply does not need to be prepared for the camera 2 serving as the terminal device.

When the electric power is superposed on the signal transferred from the communication path in the case where neither the low-voltage power supply terminal 602 nor the high-voltage power supply terminal 603 is connected to the respective external power supply, the second superposition unit 609 superposes the electric power on the signal to be transferred to the camera 2 by the signal processing unit 605. At this time, the second superposition unit 609 uses the superposed electric power.

The second superposition unit 609 supplies the electric power to the terminal device using the high-voltage electric power supplied from the primary modem 5. At this time, the second superposition unit 609 uses the high-voltage electric power without converting the voltage of the supplied electric power. Therefore, there occurs no loss due to conversion of the voltage of the electric power used by the second superposition unit 609.

Note that the primary modem 5 may include a second superposition unit that superposes, on a signal, electric power to be supplied to the monitoring terminal unit 3. At this time, the monitoring terminal unit 3 may be configured to be operated by the electric power superposed by the second superposition unit.

The terminal device may be, for example, a display provided in the car of the elevator. At this time, the display is connected to the connection terminal 601 of the secondary modem 6. The display displays the contents indicated by the signal transferred from the terminal device connected to the primary modem 5.

Embodiment 2

In Embodiment 2, points different from those in the examples disclosed in Embodiment 1 will now be described in detail. Any feature of the examples disclosed in Embodiment 1 may be adopted for features which are not described in Embodiment 2.

Figure 3:
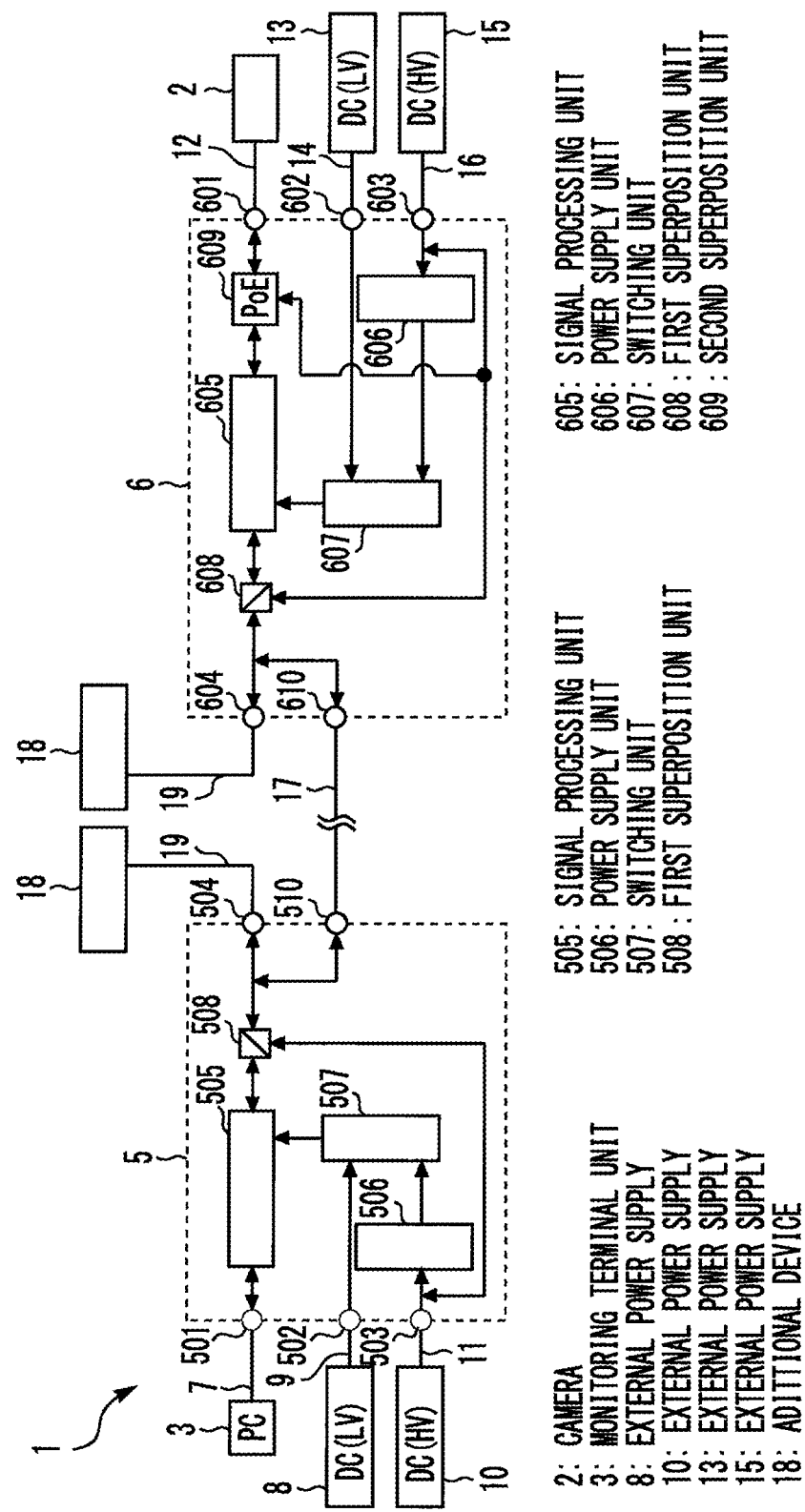
FIG. 3 is a circuit diagram illustrating a configuration of a communication system provided with modems according to Embodiment 2.

FIG. 2 and FIG. 3 each are a circuit diagram illustrating a configuration of a communication system provided with modems according to Embodiment 2.

FIG. 2 illustrates a state in which a primary modem 5 and a secondary modem 6 are connected to each other.

A communication system 1 includes a cable 17. The cable 17 forms a communication path through which a signal is communicated between the primary modem 5 and the secondary modem 6. The cable 17 is a cable that connects between the primary modem 5 and the secondary modem 6. The cable 17 is, for example, a twisted pair cable.

The primary modem 5 includes an additional communication terminal 510. The additional communication terminal 510 is a communication terminal that branches from the communication terminal 504. The additional communication terminal 510 is a terminal for transferring a signal to the communication path. The same signal as that on the communication terminal 504 is input from and output to the additional communication terminal 510. The additional communication terminal 510 is connected to the cable 17.

The secondary modem 6 includes an additional communication terminal 610. The additional communication terminal 610 is a communication terminal that branches from the communication terminal 604. The additional communication terminal 610 is a terminal for transferring a signal to the communication path. The same signal as that on the communication terminal 604 is input from and output to the additional communication terminal 610. The additional communication terminal 610 is connected to the cable 17.

FIG. 3 illustrates a state in which two additional devices 18 are connected to a primary modem 5 and a secondary modem 6, respectively.

One of the two additional devices 18 is connected to a communication terminal 504 through a cable 19. The other of the two additional devices 18 is connected to a communication terminal 604 through a cable 19. The cable 19 is, for example, a coaxial cable or a twisted pair cable.

The additional device 18 is, for example, a measuring device. The measuring device is a device for checking the characteristic of the signal. The characteristic of the signal is, for example, a waveform quality.

The additional device 18 is, for example, a terminal device.

The additional device 18 is, for example, an additional modem. The additional modem processes and transfers a signal between the additional modem and a terminal device connected thereto.

As described above, the primary modem 5 according to Embodiment 2 includes a plurality of communication terminals for transferring a signal to the communication path.

The communication terminal 504 and the communication terminal 510 can form network topology of the communication system 1 flexibly.

The communication terminal 504 is configured to be connectable with the coaxial cable. The communication terminal 510 is configured to be connectable with the twisted pair cable. That is, a different type of cable can be connected to any of the plurality of communication terminals. In this way, the communication system 1 can be flexibly constructed according to the installation environment.

The communication terminal 504 or the communication terminal 510 is connectable with the measuring device for checking the characteristic of the signal.

The measuring device can be connected without changing the network configuration that has been already constructed. This enables the measuring device to easily check the characteristic of the signal that is communicated by the modem. It is not necessary to attach a divider to check the characteristic of the signal by the measuring device.

In addition, the communication terminal 504 or the communication terminal 510 is connectable with at least one of the terminal device and the modem that processes and transfers the signal between the communication terminal 504 or the communication terminal 510 and the terminal device.

When the signal processing unit 505 and the signal processing unit 605 are operated in a communication mode allowing communication with a plurality of devices, the signal processing unit 505 and the signal processing unit 605 can communicate with a plurality of modems or terminal devices through a plurality of respective communication terminals. In this way, it is possible to easily construct a communication system including a plurality of cameras and modems.

Note that each of the primary modem 5 and the secondary modem 6 may include three or more communication terminals. Some or all of the plurality of communication terminals may be terminals to be connected with the same type of cables. Each of the primary modem 5 and the secondary modem 6 may be connected with a plurality of additional devices 18.

INDUSTRIAL APPLICABILITY

The modem according to the present invention can be applied to a communication system in an elevator monitoring system.

REFERENCE SIGNS LIST

1 Communication system
2 Camera
3 Monitoring terminal unit
4 Cable
5 Primary modem
6 Secondary modem
7 Cable
8 External power supply
9 Power supply cord
10 External power supply
11 Power supply cord
12 Cable
13 External power supply
14 Power supply cord
15 External power supply
16 Power supply cord
17 Cable
18 Additional device
19 Cable
501 Connection terminal
502 Low-voltage power supply terminal
503 High-voltage power supply terminal
504 Communication terminal
505 Signal processing unit
506 Power supply unit
507 Switching unit
508 First superposition unit
510 Communication terminal
601 Connection terminal
602 Low-voltage power supply terminal
603 High-voltage power supply terminal
604 Communication terminal
605 Signal processing unit
606 Power supply unit
607 Switching unit
608 First superposition unit
609 Second superposition unit
610 Communication terminal

The invention claimed is:

1. A modem comprising:
signal processing circuitry that processes and transfers a signal between a terminal device and a communication path;
power supply circuitry that generates electric power as a power supply of the signal processing circuitry from input electric power;
a low-voltage power supply terminal that is at no time connected to the power supply circuitry;
a high-voltage power supply terminal that is connected to the power supply circuitry; and
first superposition circuitry that, when electric power is input from the low-voltage power supply terminal connected to a first external power supply to the signal processing circuitry, does not superpose the electric power on the signal to be transferred to the communication path by the signal processing circuitry, and, when the electric power is input from the high-voltage power supply terminal connected to a second external power supply to the signal processing circuitry through the power supply circuitry, superposes the electric power input from the high-voltage power supply terminal on the signal to be transferred to the communication path by the signal processing circuitry.

2. The modem according to claim 1, wherein
when the electric power is superposed on the signal transferred from the communication path in a case where neither the low-voltage power supply terminal nor the high-voltage power supply terminal is connected to the respective first and second external power supplies, the power supply circuitry generates the electric power as the power supply of the signal processing circuitry from the superposed electric power.

3. The modem according to claim 1, comprising:
second superposition circuitry that, when the electric power is input from the low-voltage power supply terminal connected to the first external power supply to the signal processing circuitry, does not superpose the electric power on the signal to be transferred to the terminal device by the signal processing circuitry, and, when the electric power is input from the high-voltage power supply terminal connected to the second external power supply to the signal processing circuitry through the power supply circuitry, superposes the electric power input from the high-voltage power supply terminal on the signal to be transferred to the terminal device by the signal processing circuitry.

4. The modem according to claim 3, wherein
when the electric power is superposed on the signal transferred from the communication path in a case where neither the low-voltage power supply terminal nor the high-voltage power supply terminal is connected to the respective first and second external power supplies, the second superposition circuitry superposes the electric power on the signal to be transferred to the terminal device by the signal processing circuitry using the superposed electric power.

5. The modem according to claim 1, comprising:
a plurality of communication terminals each that transfer the signal to the communication path.

6. The modem according to claim 5, wherein
each of the communication terminals is connectable with a measuring device to check a characteristic of the signal.

7. The modem according to claim 5, wherein
each of the communication terminals is connectable with at least one of the terminal device and a second modem that processes and transfers the signal between the communication terminal and the terminal device.

8. The modem according to claim 1, wherein
the high-voltage power supply terminal is at all times connected to the power supply circuitry.

9. The modem according to claim 1, wherein
the low-voltage power supply terminal receives a first voltage, and
the high-voltage power supply terminal receives a second voltage greater than the first voltage.

10. The modem according to claim 1, wherein
the high-voltage power supply terminal is directly connected to the first superposition circuitry.

11. The modem according to claim 1, wherein
the modem is without a Power over Ethernet (PoE) processor.

12. The modem according to claim 1, wherein
the low-voltage power supply terminal and high-voltage power supply terminal are different from a terminal for the communication path.

* * * * *